United States Patent
Yoshida et al.

(10) Patent No.: US 7,154,619 B1
(45) Date of Patent: Dec. 26, 2006

(54) IMAGE FORMING APPARATUS AND TERMINAL DEVICE CONNECTED TO NETWORK

(75) Inventors: Eiichi Yoshida, Toyokawa (JP); Akio Nakajima, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 1109 days.

(21) Appl. No.: 09/161,277

(22) Filed: Sep. 28, 1998

(30) Foreign Application Priority Data

Sep. 30, 1997 (JP) .................... 9-265620

(51) Int. Cl.
*G06F 13/00* (2006.01)
*G06F 3/12* (2006.01)

(52) U.S. Cl. ..................... 358/1.14; 358/1.16

(58) Field of Classification Search ............... 358/1.15, 358/1.14, 1.16, 1.17
See application file for complete search history.

(56) References Cited

U.S. PATENT DOCUMENTS 5,716,148 A * 2/1998 Tamagaki ................. 400/74
5,791,790 A * 8/1998 Bender et al. ............ 400/61

FOREIGN PATENT DOCUMENTS

| JP | 62-289046 | 12/1987 |
|---|---|---|
| JP | 4-37916 | 2/1992 |
| JP | 4-47750 | 2/1992 |
| JP | 7-38691 | 2/1995 |
| JP | 7-038891 | 2/1995 |
| JP | 8-272566 | 10/1996 |
| JP | 9-39310 | 2/1997 |
| JP | 9-39311 | 2/1997 |
| JP | 9-1010869 | 4/1997 |

* cited by examiner

*Primary Examiner*—Douglas Q. Tran
(74) *Attorney, Agent, or Firm*—McDermott Will & Emery LLP

(57) ABSTRACT

An image forming apparatus receives a print request and image information data from a terminal device connected to it via a network and executes a print job. The print job processing status is stored in a non-volatile memory. When the power to the printer is restored after being terminated, where print jobs that have not yet been processed are determined to exist after reference to the print job processing status stored in the non-volatile memory. The terminal device that requested said print job is requested to resend the image information data for that print job. Therefore, if the terminal device is constructed such that it receives the resend request and resends the image information data, the image forming apparatus can smoothly execute the non-processed print jobs based on the resent image information data.

1 Claim, 6 Drawing Sheets

| | Requesting Device Identifier | JOB Number | Image Address | Image Size |
|---|---|---|---|---|
| (1) | 2A | 0 | 1000H | 200H |
| (2) | 2A | 1 | — | — |
| (3) | 2B | 0 | 0H | 100H |
| (4) | 2A | 2 | 10000H | 500H |
| (5) | 2B | 1 | 500H | 100H |

| Requesting Device Identifier | JOB Number | Image Address | Image Size |
|---|---|---|---|
| 2A | 0 | 1000H | 200H | (1) |
| 2A | 1 | — | — | (2) |
| 2B | 0 | 0H | 100H | (3) |
| 2A | 2 | 10000H | 500H | (4) |
| 2B | 1 | 500H | 100H | (5) |
| ..... | ..... | ..... | ..... |

Fig. 6

IMAGE FORMING APPARATUS AND TERMINAL DEVICE CONNECTED TO NETWORK

This application is based on application No. 9-265620 filed in Japan, the contents of which is hereby incorporated by reference.

BACKGROUND OF THE INVENTION

1. Field of the Invention

The present invention pertains to an image forming apparatus and a terminal device such as a personal computer that are connected to a network, and to an image forming system that incorporates them both.

2. Description of the Related Art

In recent years, various types of office machines have increasingly come to be connected to networks and used in concert with each other. In particular, when a printer is connected to a network comprising multiple personal computers, a printer setup having superior cost performance can be established due to the fact that multiple users can jointly use the same printer.

In this type of printer setup, first, the print request and a sequence of print data are sent from the terminal device to the printer via the network. The printer receives these signals, stores the print data temporarily in an image memory, and then performs printing based on the print data (a printing operation based on a single print request such as described here will be referred to hereinafter as a 'print job').

Normally, a relatively inexpensive volatile memory is used for the image memory, and consequently, where the power to the printer goes out due to a sudden failure or some other reason, all of the received print job data is lost, and the print jobs cannot be performed.

As a result, up to now it has been necessary for the user to resend the print job data from the terminal device. However, for some users it is extremely inconvenient to resend the data. In addition, where the printer is located far away from the personal computer, the user often does not even know that the power to the printer has failed, and finds out for the first time that his own print job has been lost only after waiting for a period of time and then going to where the printer is located to retrieve it.

In order to eliminate these problems, a technology has been disclosed in Japanese Laid-Open Patent Application Hei 4-47750, for example, in which the received print job data is backed up in a non-volatile memory in the printer, wherein even if the power fails, the performance of the print job can be continued as soon as power is restored.

However, when using the backup method described above, a large-capacity non-volatile memory is necessary in the printer to store all of the received print job data, which increases the cost of the printer significantly.

SUMMARY OF THE INVENTION

Taking these problems into consideration, the object of the present invention is to provide an image forming apparatus and an image forming system in which, even if the power to the printer is suddenly lost for some reason, the printer has a resume function whereby it is quickly restored to its state before the power failure occurred and the print job processing is continued as soon as the power is restored, while the substantial increase in cost that would be required to incorporate a large-capacity non-volatile memory is avoided.

In order to achieve this object, the present invention comprises an image forming apparatus that performs printing based on data sent from an external terminal device connected to it via a network, wherein said apparatus has a non-volatile memory that stores the print job processing status, a determining means that determines, when the image forming apparatus has been restored to its normal state, whether there are any jobs remaining to be printed based on the print job processing status information stored in the non-volatile memory, and a resend request issuing means that requests a terminal device that sent data of an outstanding print job to resend the data when it is determined by the determining means that the outstanding print job exists.

In an embodiment of the present invention, one example of the printer returning to its normal state would be when the power is restored after a shutdown. Said embodiment also has a job identification information supply means that provides job identification information to each print job data sent from the external terminal device.

The present invention also comprises a terminal device that sends data to an image forming apparatus connected to it via a network to cause the apparatus to perform printing, wherein said terminal device has a means that receives a data resend request sent from the image forming apparatus when the image forming apparatus has been restored to its normal state, and a data resend means that resends the data in response to the resend request.

The present invention further comprises an image forming system in which an image forming apparatus and a terminal device are connected via a network and the image forming apparatus executes printing based on data sent from the terminal device, wherein said image forming apparatus has a non-volatile memory that stores the print job processing status, a determining means that determines, when the image forming apparatus has been restored to its normal state, whether or not there are any jobs remaining to be printed based on the processing status information stored in the memory, and a transmitting means that sends resend request information to request the terminal device that sent the print job data to resend it, and wherein said terminal device has a means that receives data resend request information sent from the image forming apparatus and a data resend means that resends said data in response to the receipt of said resend request information.

The present invention further comprises a print resume method for an image forming apparatus to perform printing based on data sent from an external terminal device connected to it via a network, wherein said method comprises steps in which (1) the print job processing status is stored in a non-volatile memory, (2) it is determined, when the image forming apparatus has been restored to its normal state, whether or not there are any jobs remaining to be printed based on the processing status information stored in the memory, (3) where it is determined by said determining means that there are print jobs remaining to be printed, the terminal device that sent said print job data is requested to resend it, and (4) printing is resumed based on the data sent from the terminal device.

The present invention further comprises a data sending method for the terminal device to send data to the image forming apparatus connected to it via a network and cause it to perform printing, wherein said method comprises steps in which (1) print data is sent to the image forming apparatus, (2) a print data resend request sent from the image forming apparatus when the image forming apparatus has been restored to its normal state is received, and (3) the print data is resent in response to said resend request.

The present invention further comprises a print data transmission method for an image forming system in which an image forming apparatus and a terminal device are connected via a network, and printing is performed by said image forming apparatus based on print data sent from said terminal device, wherein said method comprises steps in which the image forming apparatus (1) stores the print job processing status in a non-volatile memory, (2) determines, when the image forming apparatus has been restored to its normal state, whether or not there are any jobs remaining to be printed based on the processing status information stored in the memory, and (3) where it is determined that there are print jobs remaining to be printed, sends resend request information requesting that the terminal device that sent said print job data to resend it, and steps in which the terminal device (1) receives the print data resend request information sent from the image forming apparatus and (2) resends the print data in response to the receipt of said resend request information.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

An embodiment of the image forming apparatus pertaining to the present invention will now be explained using the example of a printer.

Figure 1:
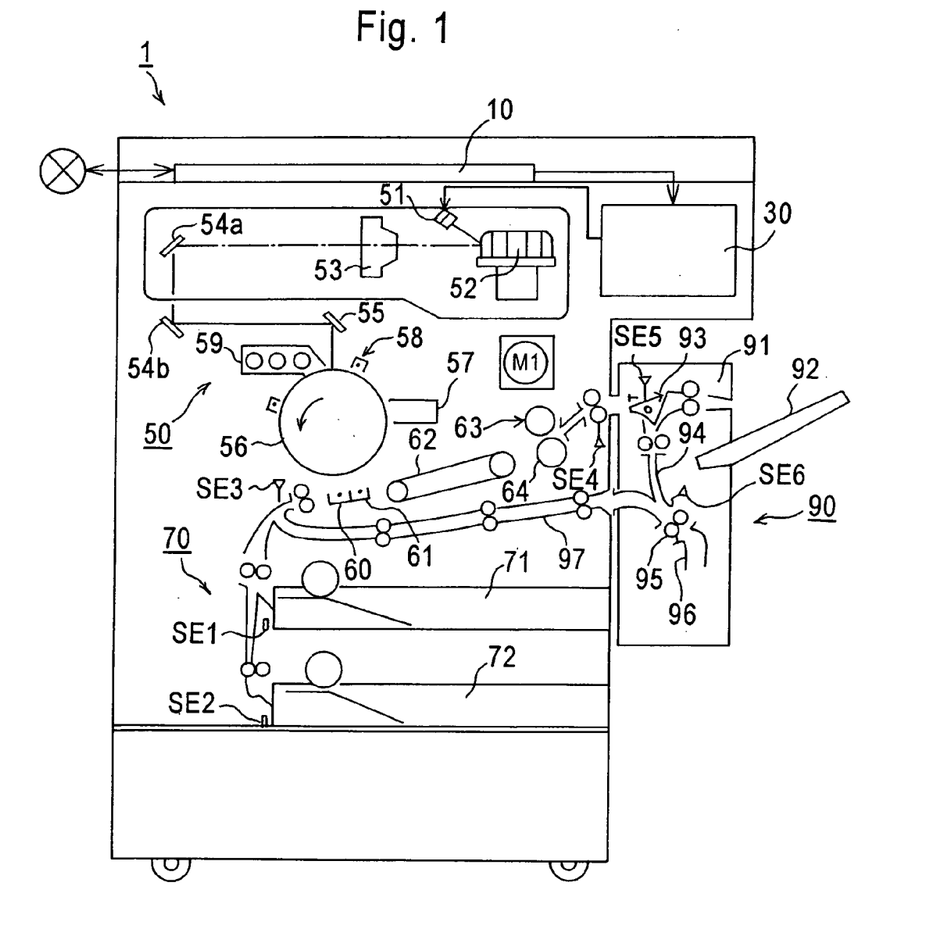
FIG. 1 is a drawing showing the entire construction of a printer pertaining to an embodiment of the present invention.

FIG. 1 is a drawing showing the entire construction of said printer 1. As shown in the drawing, the printer 1 has a communication controller 10, a print controller 30, a printer unit 50, a paper supply unit 70 and a paper re-supply unit 90.

The communication controller 10 controls the communication of signals sent to and from the external devices via the network and sends the received print data to the print controller 30 after developing a bitmap image if necessary. The print data may be either code data or the image data itself.

The print controller 30 outputs exposure control signals based on the image data received by the communication controller 10 or the image data received and bitmapped by the communication controller 10, and performs control of the printer unit 50, paper supply unit 70, paper re-supply unit 90, etc., to cause them to perform an image forming operation in a smooth fashion.

The printer unit 50 reproduces the image on a sheet of recording paper using the public-domain electrophotographic method, and a laser diode 51 performs laser irradiation by means of a light-modulated laser beam based on exposure control signals output from the print controller 30. This laser beam is reflected off the mirror surface of a polygon mirror 52 that rotates at a prescribed angular speed, and irradiates the surface of a photoreceptor. drum 56 via an f( lens 53 and mirrors 54a, 54b and 55.

Prior to receiving exposure by the laser beam, any remaining toner on the photoreceptor surface is cleaned by means of a cleaning member 57, and after any charge present is eliminated by means of an eraser lamp not shown in the drawings, the photoreceptor drum 56 is uniformly charged by means of a charger 58. When it is then exposed by said laser beam, an electrostatic latent image is formed. This electrostatic latent image receives toner from a developing device 59 and is developed into a toner image.

The paper supply unit 70 supplies sheets of recording paper of prescribed sizes to the printer unit 50, and includes two paper cassettes 71 and 72. The size of the sheets of paper stacked in these cassettes is detected by paper size sensors SE1 and SE2 using the photoelectric method, for example, and a paper cassette is selected by the print controller 30 based on the detection signals from the sensors SE1 and SE2. A sheet of recording paper of the required size is supplied synchronously with the image formation on the photoreceptor drum 56, and the toner image on the surface of the photoreceptor drum 56 is transferred to the surface of the recording paper at the transfer position underneath the photoreceptor drum 56 by means of an electrostatic charge from a transfer charger 60.

The recording paper is then separated from the surface of the photoreceptor drum 56 by a separator charger 61 and is conveyed to a fuser unit 63 by a conveyor belt 62, and the image is then fused onto the recording paper by means of the application of pressure and heat by a fuser roller 64 equipped with an internal heater.

After fusing, the recording paper is ejected onto a paper eject tray 92 via a conveyance path 91 located in the paper re-supply unit 90.

Where an image is to be reproduced on the back side of the sheet of recording paper as well (two-sided printing), the paper re-supply unit 90 flips the sheet of recording paper regarding which image formation was already performed on the front side onto its back side and re-supplies it to the transfer position. Where two-sided printing is to be performed, it enables printing onto the back side of the recording paper by causing the left tip of a switching claw 93 of the paper re-supply unit 90 to face upward, guiding the recording paper into the conveyance path 94, feeding the paper forward in the direction of a flipping conveyance path 96 by means of a flipping roller 95, and then causing the flipping roller 95 to rotate backward to send the paper to the transfer position underneath the photoreceptor drum 56 via the conveyance path 97.

Sensors SE3 through SE6 are jam detection sensors comprising photoelectric detectors using the reflection method that are equipped with, for example, light-emitting elements and photoelectric conversion elements. These sensors detect the conveyed recording paper, and where the trailing edge of the recording paper is not detected within a prescribed period of time after the leading edge of the paper is detected, the print controller 30 determines that a paper jam has occurred.

Figure 2:
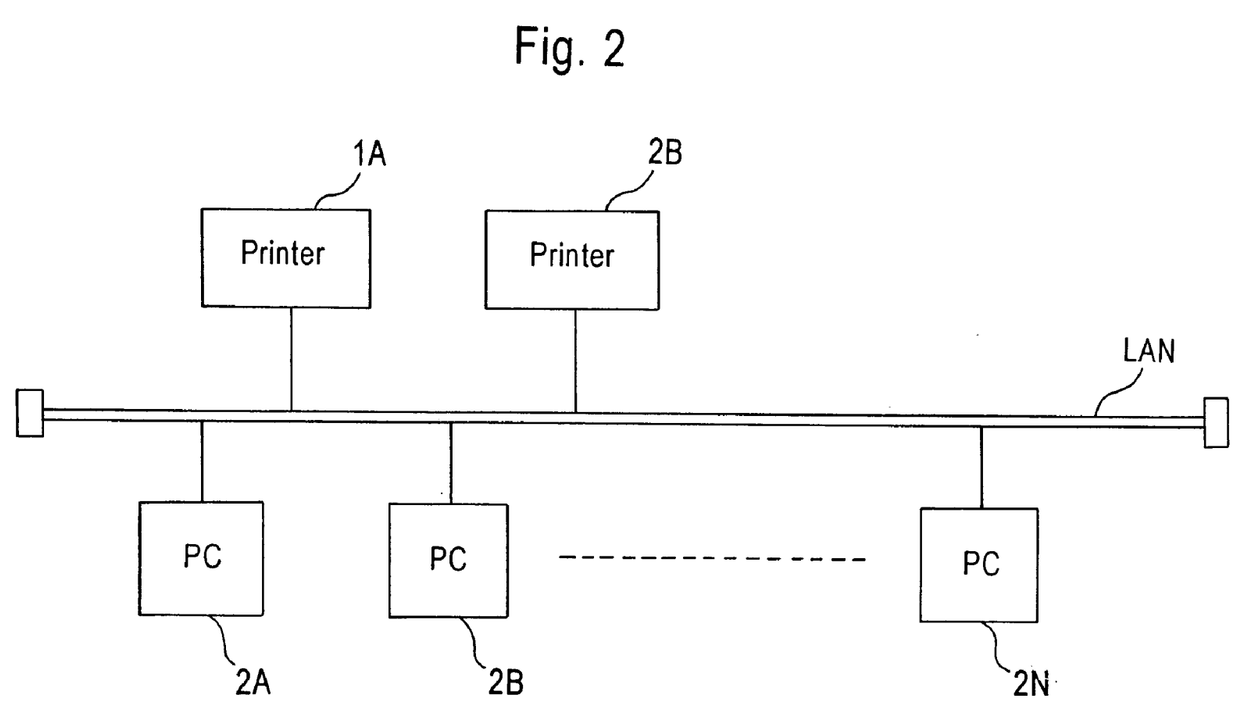
FIG. 2 is a drawing showing the entire construction of a printer system in which said printer and multiple computers are connected via a network.

FIG. 2 is a drawing showing an example of the construction of a printer system in which the printer described above is connected to personal computers (hereinafter simply 'computers') via a network.

As shown in the drawing, two printers 1A and 1B are connected to multiple computers 2A through 2N, which operate as terminal devices, via a LAN (local area network) in this printer system. By designating a printer and sending a print request and image data from one of the computers via the LAN, a printing operation is performed by the designated printer. Here, any type of LAN configuration is acceptable, such as the public-domain Ethernet or Token Ring constructions.

Each computer 2A through 2N comprises a general-purpose computer equipped with a display, a CPU, input devices (a keyboard and a mouse), external storage devices (a hard disk drive and a floppy disk drive), etc., and incorporates a LAN interface. It also has LAN connection application software installed on it.

Figure 3:
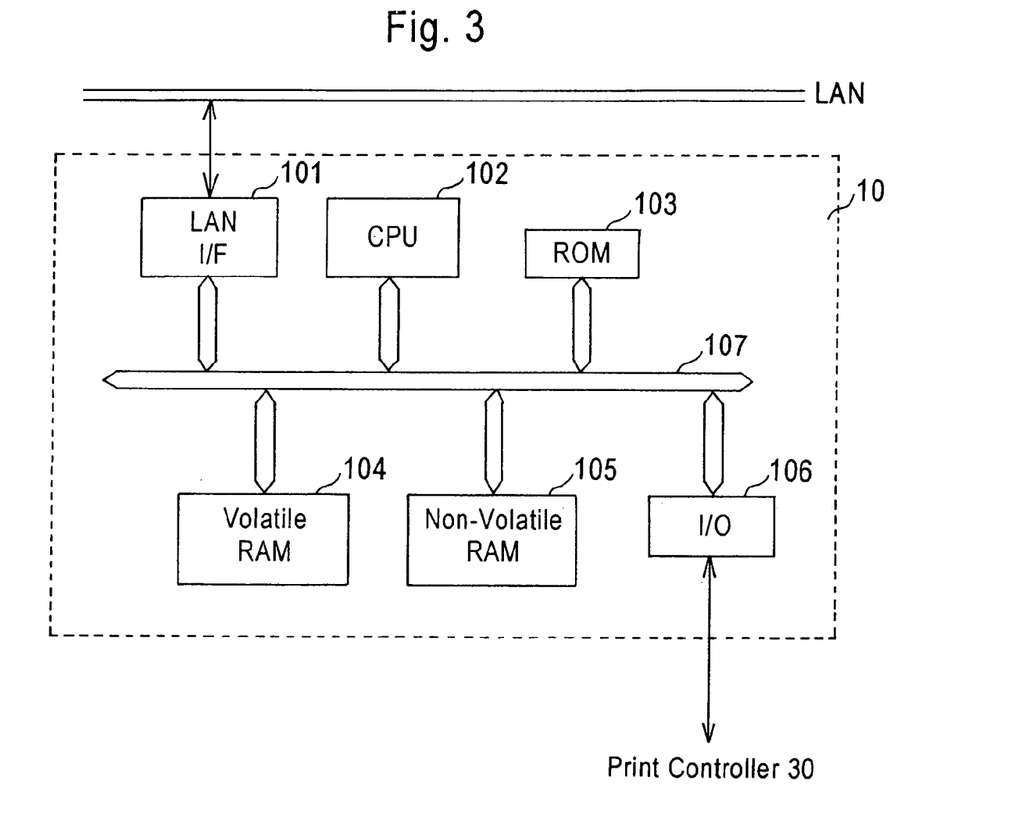
FIG. 3 is a block diagram showing the construction of a communication controller located inside said printer.

FIG. 3 is a block diagram showing the construction of the communication controller 10 in each printer 1A and 1B.

The communication controller 10 comprises a LAN interface 101, a CPU 102, a ROM 103, a volatile RAM 104, a non-volatile RAM 105 and an I/O port 106 which are connected to one another via a data bus 107.

Programs necessary for the control of network communications, and data and programs for bitmapping where the received print data comprises a sequence code such as a page description language (PDL), are stored in the ROM 103.

The volatile RAM 104 temporarily stores image data and control variables in memory. Where the print data received from the computer comprises a sequence code, the print data is stored in the volatile RAM 104 after it is bitmapped by the CPU 102 based on programs resident in the ROM 103. Where the received print data comprises already bitmapped data (image data), it is stored in the volatile RAM 104 as is. This volatile RAM 104 can accept as many print requests from the computers 2A through 2B as free memory exists to handle them.

The non-volatile RAM 105 stores the identifier for the device that issued the print request and the job number in the job control table stored in said RAM, while associating them with each other.

When printing is underway, the image data stored in the volatile RAM 104 is read out in sequence and sent to the print controller 30 via the I/O port 106. The print controller 30 performs printing based on this image data.

Figure 4:
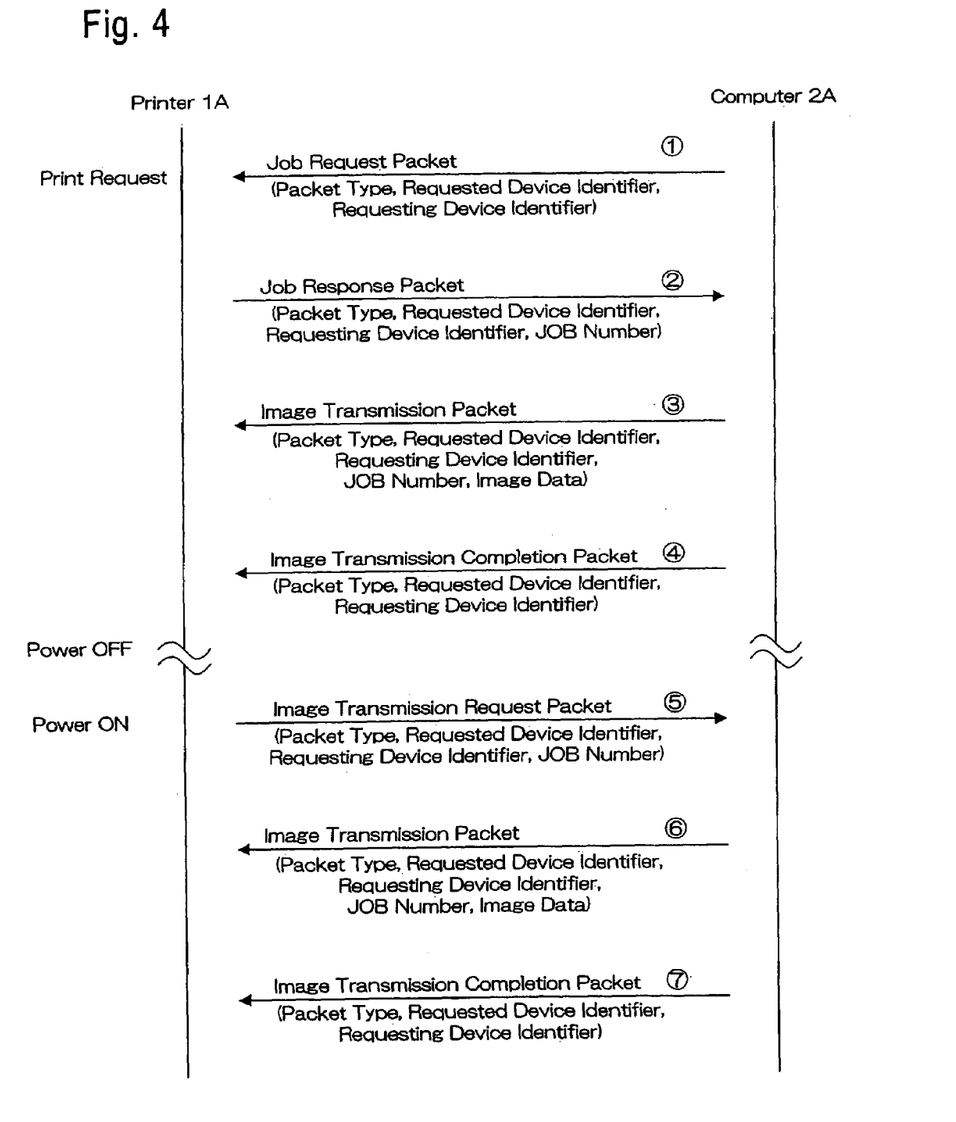
FIG. 4 is a drawing showing the communication sequence between the printer and the computer.

FIG. 4 is a drawing showing the communication sequence where handshaking between the computer 2A and the printer 1A is performed and the print job is then executed. This example explains the case in which bitmapped image data is transmitted from the computer 2A. First, the user sends a print request packet from the computer 2A to the network (①). Here, a 'packet' refers to data transmitted in accordance with a LAN communications protocol, and a 'print request packet' includes information (hereinafter simply the 'packet type') indicating the type of packet (In step ①, the print request), an identifier indicating the device that issued the request (the requesting device identifier) and an identifier indicating the device to which the request was issued (the requested device identifier).

The requesting device identifier and requested device identifier are identifiers that were previously allocated when each device was connected to the LAN. Any identifier that enables proper identification of each computer and printer is acceptable. In this embodiment, for ease of comprehension the identifiers used to designate the printers 1A and 1B and the computers 2A through 2N will be the same designations used herein, i.e., '1A', '1B', and '2A' through '2N'.

The requesting device identifier and requested device identifier consist of information that is normally included in each packet that is sent according to the LAN communications protocol in order to specify the device to which the communication is transmitted.

When the communication controller 10 of the printer 1A receives the print request packet from the computer 2A, first, it confirms that the requested device identifier included in the packet is its own identifier (1A), and then accepts the print request. After it accepts the print request, it assigns a job number that has not previously been used in association with the requesting device identifier 2A, using the job control table stored in the non-volatile RAM 105, and then registers the requesting device identifier 2A together with the associated job number in the job control table.

Figure 5:
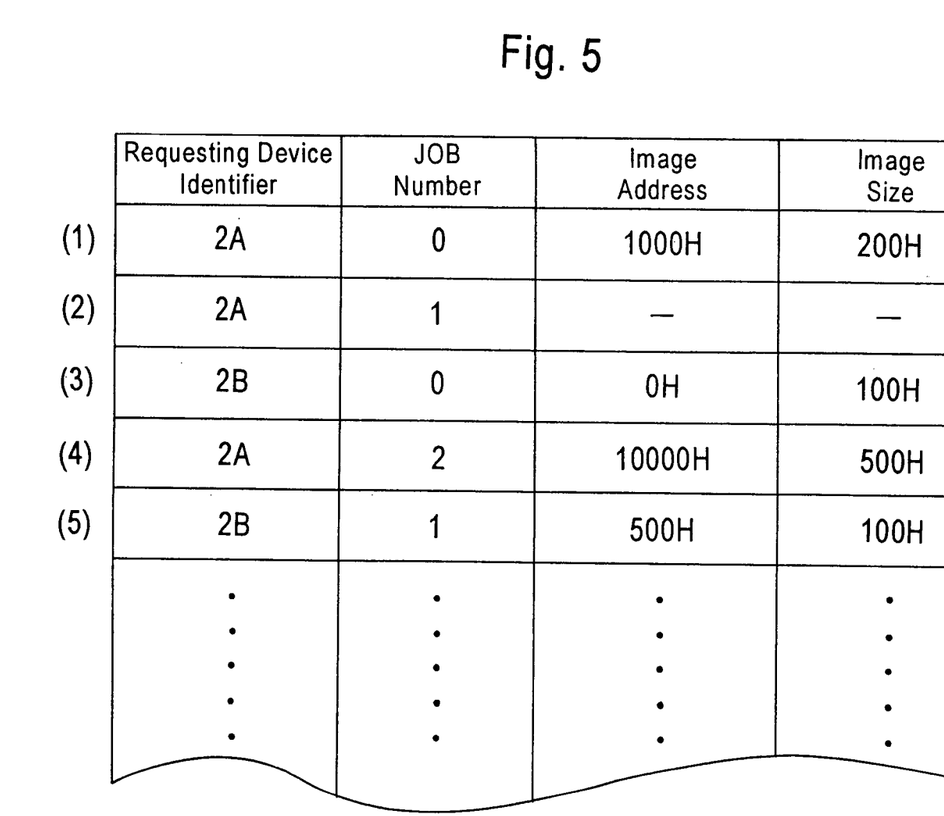
FIG. 5 is a drawing showing an example of the job control table prepared on the printer side.

FIG. 5 is a drawing showing one example of the construction of said job control table.

Requesting device identifiers included in the received print request packets are registered in the leftmost requesting device identifier column, and where multiple print jobs are requested from the computer having the same requesting device identifier, the job numbers used to differentiate among said print jobs are allocated in sequence for each requesting device identifier, beginning with '0'.

For example, when the registration of print jobs has been completed up to the row (3) in the drawing, if a print request packet is received from the computer 2A, the requesting device identifier '2A' is registered in the requesting device identifier column for the row (4), and a job number for that print job is set. Because the job numbers '0'and '1' are already allocated to requesting device identifier 2A, the job number '2' is allocated and registered in the job number column.

A job number allocated in this way in response to a print request from a different computer is sent to the computer 2A via the network in a 'job response packet' together with the packet type indicating that it comprises a response to a job request and information on the requested device identifier '1A' and requesting device identifier '2A' (②).

The computer 2A confirms that the requesting device identifier included in the received packet is '2A', and then accepts the packet. When it determines that the packet is a job response packet based on the packet type, the computer 2A associates the job number given in the packet with the file name or the image memory address for the job (image data) sought to be printed and stores them in an image data control table (not shown in the drawings) in the internal RAM.

The computer 2A then sends a packet, which includes the job number and the image data corresponding to this job number, the requesting device identifier, the requested device identifier, and the packet type indicating that image data is being transmitted, as an image transmission packet (③). When sending of the image data is completed, the computer 2A sends a packet including the packet type indicating that the image data was sent, as well as the requested. device identifier and the requesting device identifier, as an image transmission completion packet (④).

On the other hand, the printer 1A receives said image transmission packet and image transmission completion packet, and then (i) stores the transmitted image data in the non-volatile RAM 104, (ii) associates it with its job number, and (iii) stores the storage address for the image data in the volatile RAM 104 and the amount (size) of said image data in the image address column and the image size column, respectively, of the job control table. If the image data is not to be stored in the volatile RAM 104, 'none' is registered in the image address column and the image size column.

The print controller 30 controls the printer unit 50, paper supply unit 70 and paper re-supply unit 90 so that print jobs are executed in the order in which they were stored in the job control table. The communications controller 10 clears the job control table registration contents and the image data stored in the volatile RAM 104 for each print job as it is completed.

Where the power to the printer 1A is terminated by mistake while a print job is being processed, the non-printed image data stored in the volatile RAM 104 is lost. This kind of unexpected situation can occur due to, for example, (i) another user mistakenly turning the power switch to the printer to the OFF position, or kicking the power cord to the printer and unplugging it from the power outlet, or (ii) the circuit breaker governing the power outlet being used by the printer being tripped due to overloading.

Even if the problem is resolved and power to the printer is restored, however, because the image data is lost and print jobs cannot be executed without it, the present embodiment performs the following processes.

First, when the power is restored by turning the power switch ON, etc., after power was lost, where the computer 2A determines that a non-printed job exists by referring to the job control table in the non-volatile RAM 105, it generates an image transmission request packet and sends it via the network to the computer that sent the original job request so that it will send the image data again, while designating a job number ((5)).

For example, in the job control table shown in FIG. 5, where the power is lost after the job processing for job (3), i.e., the job having job number '0' for the computer 2B is completed, the job having the job number '2' for the computer 2A and the job having the job number '1' for the computer 2B are remaining in the job control table as unprocessed jobs. When this occurs, the printer 1A sends to the computer 2A via the network an image transmission request packet requesting that it send the image data for the job number '2', and sends to the computer 2B via the network an image transmission request packet requesting that it send the image data for the job number '1'.

When receiving this image transmission request packet, the computer 2A reads out from its own image memory the image data associated with the designated job number, by referring to the image data control table, and sends it as an image transmission packet ((6)). When sending of the image data is completed, it sends an image transmission completion packet indicating that transmission was completed ((7)).

Upon receiving the resent image data, the printer 1A resumes processing of the print job.

Figure 6:
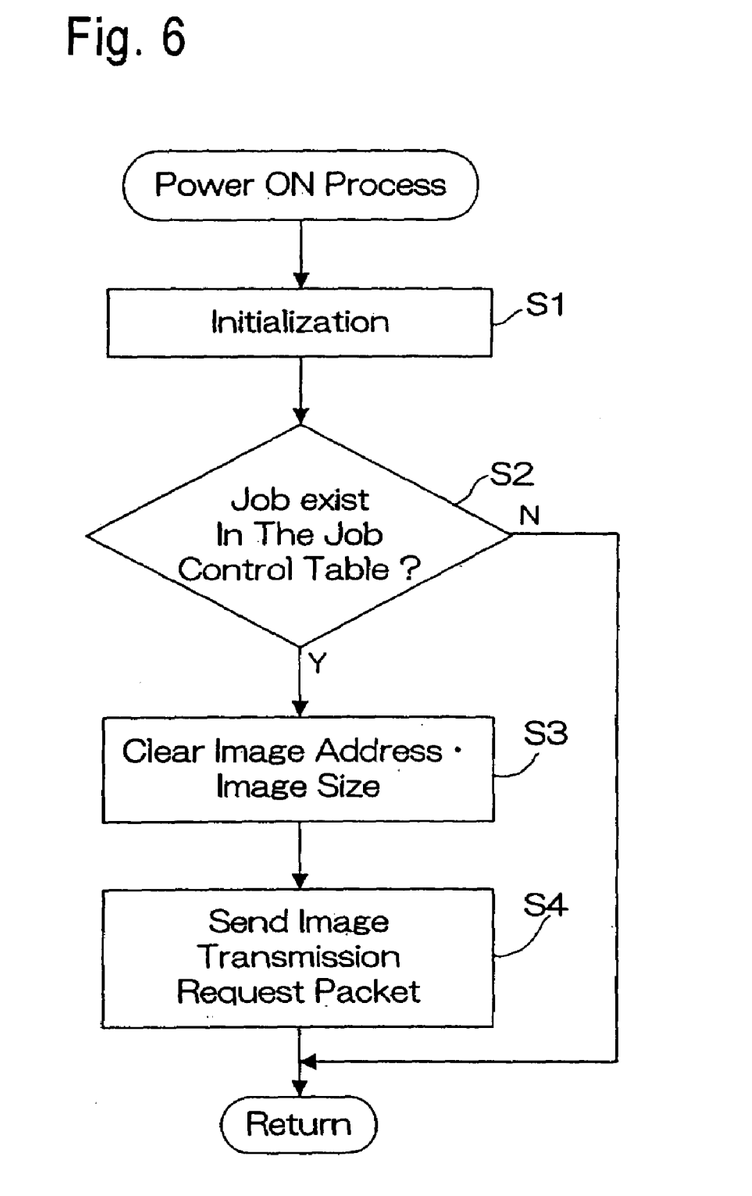
FIG. 6 is a flow chart showing the printer processes performed after power is restored.

FIG. 6 is a flow chart showing the control of the printer 1A when the power is restored to the printer after it was terminated.

When the power is restored, first, the CPU 102 initializes the control variables and flags in the volatile RAM 104 and the I/O port 106 (step S1), and then determines with reference to the job control table in the non-volatile RAM 105 whether or not any unprocessed print jobs exist (step s2).

If there is a remaining unprocessed print job, it clears the image address and the image size stored in the job control table for that print job (step S3) because it would be meaningless to keep them any longer when the pertinent image data has been lost from the volatile RAM 104. The image address and image size will be updated when the image data for this job is resent.

The CPU 102 generates an image transmission request packet that includes the identifiers for the computer requesting the print job (2A) and the printer itself (1A), as well as an image transmission request, and sends it via the network (step S4), whereupon the CPU 102 returns to the main routine (not shown in the drawings) to perform control of the operation of the entire printer, and then waits for the resending of the image data from the computer 2A in order to resume the print job.

By having this type of resume function, if power to the printer is terminated for some reason and the image data received and stored in the volatile RAM 104 is lost, the situation before the power was lost can be restored quickly and processing of the print job can be resumed by having the printer refer to the job control table stored in the non-volatile RAM 105, request that the image data be resent, and receive the resulting transmission of said image data.

Furthermore, because the amount of memory necessary for the creation of this job control table is much less than that needed for the storage of image data, the use of relatively expensive non-volatile RAM can be minimized to the greatest possible extent, reducing the cost of the apparatus while making it possible to perform efficient job processing as described above.

The printer pertaining to this invention was explained based on an embodiment, but the present invention is naturally not limited to this embodiment, and the following variations may be possible. (1) In the above embodiment, a job number is generated by the printer, and the requesting computer is notified of this job number, so that multiple jobs from the same computer may be differentiated from one another. It is also acceptable if this job number information is generated by the computer, sent as print request packet data or as image transmission packet data to the printer and registered in the job control table. In this case, the file name for said image data stored in the computer or other designation may be used for the job number.

(2) The above embodiment discloses a printer system connected by means of a LAN, but it is also acceptable if a wide-area network constructed by means of modems and telephone lines (or wireless circuits) is used in the construction of the printer system.

(3) The above embodiment discloses personal computers as an example of the terminal devices connected to the printers via the network, but a different image information generating device, such as a word processor that can be connected to a network, may be used instead. In addition, where the printer includes an image data receiving device such as an image reader, the image data or sequence code described above need not be included in the information sent from the terminal device, and said information may comprise control data to indicate the conditions for the image formation regarding the image data obtained by means of the image data receiving device, i.e., the number of copies, information regarding enlargement or reduction, and/or other public-domain print modes.

(4) Where a single printer is connected to a single external computer, because the other device may be specified with certainty, notification of the requesting device identifier or requested device identifier need not be performed.

(5) The above embodiment was explained with regard to a situation in which the power to the printer was terminated immediately after a print job was finished, but where the power is cut off while print job processing is underway, the printer of this invention may request that the image data for that print job be re-sent from the beginning, or the page numbers for which printing is completed may be monitored and the last completed page number may be stored in the job control table, such that a transmission request packet designating the number of pages of the original document to be printed is subsequently sent to the computer that issued the original job request after the power to the printer is restored.

(6) In addition, the above embodiment was explained using a laser printer as the example of the image forming apparatus, but it is not limited to the use of a laser printer. A printer employing a different type of printing method may be used instead, such as an inkjet printer or a digital copying machine having an image reader that can also perform printing based on externally input image data.

As described above, the present invention comprises an image forming apparatus that receives a print request and image information data from a terminal device connected to it via a network and executes a print job, wherein the print job processing status is stored in a non-volatile memory, and wherein when the power to the printer is restored after being terminated, where print jobs that have not yet been processed are determined to exist after reference to the print job processing status stored in the non-volatile memory, the terminal device that requested said print job is requested to resend the image information data for that print job. Therefore, if the terminal device is constructed such that it receives the resend request and resends the image information data, the image forming apparatus can smoothly execute the non-processed print jobs based on the resent image information data, and its operational efficiency can be dramatically improved by eliminating the inconvenience of requiring the user to go to the trouble of re-sending the image information data.

Furthermore, because the memory capacity required for the non-volatile memory to store the print job processing status is significantly less than the capacity that would be required to back up the image data, the present invention may be realized at a low cost.

Moreover, because the image information data includes information designating the image formation conditions, as well as image data or sequence codes enabling image formation, and image formation using the present invention is performed based on said information and data or codes, various types of print requests from the terminal device may be issued.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image forming apparatus that performs printing based on data sent from an external terminal device via a network, comprising:

a non-volatile memory which stores printing processing information of a plurality of print jobs, the printing processing information for each print job including job identification, image data address, and job status indicating whether or not a print job has been printed;

a volatile memory which stores image data corresponding to each print job at the image data address specified by said non-volatile memory, said volatile memory subject to loss of all data when power is not supplied thereto;

determining means for determining when supply of power to the volatile memory has been interrupted, and when power has been restored to said volatile memory, determining whether there are any print jobs that have not been printed based on the job status information stored in the non-volatile memory;

resend request issuing means for requesting the terminal device that sent the image data of any print job that has not been printed to resend the image data for storing in the volatile memory; and a controller which, when power is restored to said volatile memory after being interrupted and the determining means determines that there are any print jobs that have not been printed, clears the respective image data address in the non-volatile memory prior to the image data being resent by the corresponding terminal device.

* * * * *